United States Patent [19]
Duh et al.

[11] Patent Number: 6,124,423
[45] Date of Patent: Sep. 26, 2000

[54] PROCESS FOR CRYSTALLIZING POLYETHYLENE NAPHTHALATE COPOLYMERS IN THE ABSENCE OF DEVOLATILIZATION

[75] Inventors: Ben Duh, Tallmadge; Edwin Andrew Sisson; Douglas David Callander, both of Akron, all of Ohio

[73] Assignee: Shell Oil Company, Houston, Tex.

[21] Appl. No.: 09/339,432

[22] Filed: Jun. 24, 1999

Related U.S. Application Data

[60] Provisional application No. 60/091,671, Jul. 2, 1998.
[51] Int. Cl.$^7$ ..................................... C08G 63/02
[52] U.S. Cl. .......................... 528/298; 528/301; 528/302; 528/308; 528/308.6; 528/481; 528/503
[58] Field of Search ..................................... 528/298, 301, 528/302, 308, 308.6, 481, 503

[56] References Cited

U.S. PATENT DOCUMENTS

| | | | |
|---|---|---|---|
| 3,718,621 | 2/1973 | Wilson | 260/75 |
| 4,963,644 | 10/1990 | Duh | 528/272 |
| 5,523,361 | 6/1996 | Tung et al. | 525/439 |
| 5,744,578 | 4/1998 | Duh | 528/492 |

FOREIGN PATENT DOCUMENTS

90/03993  4/1990  WIPO .

*Primary Examiner*—Samuel A. Acquah

[57] ABSTRACT

A process for crystallizing a polyethylene naphthalate copolymer by:

a) copolymerizing at least 60 mole % of 2,6-naphthalene dicarboxylic acid, based on the total moles of carboxylic acids, with polyols such as at least 80 mole % of ethylene glycol and from 2 mole % to 20 mole % of a polyol having three or more carbon atoms, each based on the total moles of polyols, to form PEN copolymer solids, and b) subsequently crystallizing the PEN copolymer solids by heating the solids to at least their sticking temperature at an average rate of at least 10° C./min, to form agglomerate-free crystallized solids.

The process may be performed under agitation. The pellets heated up in a during the crystallization step do not agglomerate or suddenly expand as the temperature rises to and through the sticking temperature of the PEN copolymers. The process allows one to rapidly heat up PEN during crystallization, and do so without conducting a prior drying step or a devolitilization step.

49 Claims, No Drawings

PROCESS FOR CRYSTALLIZING POLYETHYLENE NAPHTHALATE COPOLYMERS IN THE ABSENCE OF DEVOLATILIZATION

This application claims the benefit of U.S. Provisional Application Ser. No. 60/091,671 filed Jul. 2, 1998, the entire disclosure of which is hereby incorporated by reference.

1. FIELD OF THE INVENTION

The invention relates to crystallizing polyalkylene naphthalates, and more particularly, subjecting a polyalkylene naphthalate copolymer to a fast rate of crystallization in the absence of a devolitilization step.

2. BACKGROUND OF THE INVENTION

High molecular weight polyesters are commonly produced from low molecular weight polyesters of the same composition by solid state polymerization. The low molecular weight polyesters which are used in such solid state polymerizations are generally prepared by conventional melt polymerizations. Solid state polymerization is generally considered advantageous in that the handling of high molecular weight ultra-high viscosity molten polymers during the polymerization phase is eliminated. Thermal degradation is also essentially avoided during the solid state portion of the polymerization.

The low molecular weight polyesters utilized in solid state polymerizations are generally in the form of pellets or chips. Such pellets can vary greatly in size; however, as a general rule, the smaller the size of the pellets of polyester the faster the solid state polymerization will proceed. Very fast rates of solid state polymerization can be attained by utilizing polyesters which are in the form of porous pills.

Most thermoplastic polyesters, including polyethylene terephthalate (PET) and polyethylene naphthalate (PEN), produced by melt-phase polymerization are almost completely amorphous in nature. Such amorphous polyesters which are prepared by melt polymerization are normally crystallized from the amorphous state to the crystalline state prior to solid state polymerization to prevent the polyester pellets or chips from sticking, clumping, or agglomerating during solid state polymerization.

When an amorphous polyester is heated from ambient temperature to above its glass transition temperature (Tg) during a standard crystallization process, it will soften and become sticky at the onset of crystallization. After the polyester pellet is sufficiently crystallized, it looses its stickiness and becomes more rigid. The sticking temperature of an amorphous polyester is usually about 20° C. above its Tg. The crystallization rate of the polyester will not be fast enough to be practical until its temperature is further raised to about 30° C. above its sticking temperature. To achieve the maximum crystallization rate, the temperature of the polyester must be raised even higher. For example, PET has a Tg of 74° C. and a sticking temperature of about 95° C. The crystallization rate of PET is rather low until the temperature is raised to above 125° C., and in practice, PET is usually crystallized at temperatures between 150° C. and 190° C.

PEN has promising properties for fiber and packaging applications. PEN has a Tg of about 118° C. and a crystalline melting point $T_m$ of 268° C. It exhibits a crystallization peak between 180° C. and 220° C. Its sticking temperature is about 140° C. when in the amorphous state. According to conventional wisdom, the best crystallization temperature range for PEN polymer would be between 180° C. and 220° C.

During the crystallization process, the PEN polyester undergoes a sticky stage. This takes place within the period of time the polyester temperature exceeds the sticking (softening) temperature and the time the polyester becomes well crystallized. To mitigate the agglomeration and lumping effect as the PEN polyester pellets pass through their sticky stage, commercial-scale crystallizers for continuous crystallization of polyesters can be equipped with means to provide vigorous agitation. In a batch process, a variable speed, variable temperature rotating vessel or a fluidized bed can be used. With respect to PET polyester polymers, two types of continuous crystallizers have been widely used, namely, agitated vessels and fluidized beds.

Heretofore, in the continuous crystallization process of particulate polyesters, PET in particular, polyester pellets are charged at ambient temperature directly into the crystallizer without any pretreatment. The heat transfer medium in a crystallizer used in a continuous process is generally hot air, hot nitrogen, or hot oil in order to subject the polyester pellets to a fast rate of temperature rise and to effect a fast rate of crystallization. Under appropriate operating conditions, the PET polyester pellets can be crystallized without lumping or agglomeration.

Unlike PET pellets, however, when PEN pellets are exposed to crystallization conditions herein the rate of temperature rise toward the crystallization temperature climbs quickly, the pellets "popcorn" by undergoing a sudden and rapid expansion as they are heated to near the crystallization temperature. The puffed up skins of the pellets are very sticky and, within seconds, the pellets agglomerated tightly into big lumps, vigorous agitation notwithstanding. The popcorning phenomena indicates that those conventional PET crystallization processes in which the rate of temperature rise in a crystallizer is high, are not suitable for those desiring to crystallize PEN polyesters in large scale commercial production.

Without being bound to a theory, we believe the cause for the sudden expansion of PEN pellets during cyrstallization heat-up is that the total internal vapor pressure of volatile material (such as water) within the pellet exceeds atmospheric pressure when the temperature reaches the softening point of the PEN pellet. Once the pellet is softened, the pressurized vapors of volatiles within the pellet can expand and puff the softened PEN pellet. Two reasons exist for the high vapor pressure of the volatiles at the softening temperature of PEN pellets. First, because of the high barrier properties of PEN, the removal of volatiles from inside the pellet during the temperature rise from ambient temperature to the sticky temperature is slow. When the pellet reaches the sticky temperature, a substantial amount of volatiles remain trapped within the pellet. Second, the softening temperature of PEN is high, eg in excess of 140° C. The combination of PEN's high sticky temperature and the substantial amount of volatiles remaining within the pellet results in the total vapor pressure within the pellet exceeding atmospheric pressure. The popcorning effect is not observed in PET pellets because the sticky temperature of PET is around 95° C., which is much lower than the sticky temperature of PEN and below the boiling point of water. Further, the barrier properties of PET are lower than that of PEN. Accordingly, the combination of lower barrier properties and the lower softening temperature of PET prevents the total internal vapor pressure from exceeding atmospheric pressure, and what little volatiles remain within the PET pellet as the crystallization temperature rises from 95° C. through the boiling point of water to 110° C. are insufficient to generate a total internal vapor pressure which can distort the shape of pellet which has developed rigidity during the crystallization cycle. The sudden expansion of PEN pellets during heat up to crystallization is discussed in U.S. Pat. No. 4,963,644. According to this patent, the cause for the sudden expansion of PEN pellets during crystallization was investigated by subjecting a PEN pellet to a DTA scan at a scan rate of 10° C./min. Its DTA thermogram exhibited an endotherm near the onset of the crystallization exotherm. The endotherm was believed to arise from the sudden vaporization and/or release of volatiles, whose total internal vapor pressure exceeded atmospheric pressure, trapped inside the pellet as the PEN is softened near its crystallization temperature. This phenomenon explained the sudden expansion of PEN pellets as they were exposed to standard crystallization temperatures of 180° C. to 220° C.

The volatile material trapped inside of PEN pellets arise from a number of different sources, such as contaminants entering the process during melt polymerization or the formation of by-products generated during melt polymerization. Due to the higher temperature at which the melt of PEN polymer is held during melt polymerization compared to the temperature at which PET is held during melt polymerization, the number and quantity of by-products generated in PEN melt polymerization is greater than in PET melt polymerization. Degradation of PEN could generate water, ethylene glycol, acetaldehyde and the like. Because of the very high melt viscosity of PEN, these by-products are difficult to remove during pelletizing. Furthermore, PEN is often pelletized under nitrogen pressure. In this case, nitrogen could also be trapped inside the pellets. PET, on the other hand, generates fewer by products, is more stable in its melt state, and its melt viscosity is lower than that of PEN. The quantity of by-products generated in PET are relatively small and are more easily removed during pelletizing. Therefore, very little volatile material is trapped inside PET pellets to cause lumping and sticking problems during crystallization.

The solution proposed in U.S. Pat. No. 4,963,644 to the lumping and sticking problem of PEN pellets during crystallization was to slowly remove the volatiles trapped inside the pellets at temperatures below its sticking temperature prior to the crystallization step. This process incorporated a devolatilization step before the crystallization step. This patent calls for a devolitilization step involving (1) heating the amorphous polyethylene naphthalate to a temperature which is within the range of about 80° C. to about 140° C. in the presence of a stream of inert gas or under a vacuum to devolatilize the amorphous polyethylene naphthalate; and (2) subsequently heating the devolatilized polyethylene naphthalate to a temperature which is within the range of about 150° C. to about 260° C. while providing agitation to produce the crystallized polyethylene naphthalate.

It would be desirable, in the interest of improving the processing speed, to find a way to avoid the need for subjecting the PEN pellets to the slow devolitilization step without sacrificing the advantage of abating the tendency of the pellets to lump together into a large mass. We would desire to rapidly heat up PEN pellets during the heat up phase in a crystallization step comparable to the rapid heat up of PET pellets in crystallizers, such as fluidized or agitated bed crystallizers, without experiencing the popcorning effect.

3. SUMMARY OF THE INVENTION

There is now provided a process for crystallizing a polyethylene naphthalate copolymer comprising:

a) copolymerizing at least 60 mole % of 2,6-naphthalene dicarboxylic acid, based on the total moles of carboxylic acids, with at least 80 mole % of ethylene glycol and from 2 mole % to 20 mole % of a polyol having three or more carbon atoms based on the total moles of polyols, to form PEN copolymer solids, and b) subsequently crystallizing said solids comprising heating said solids to at least their sticking temperature at an average rate of at least 10° C./min, to form agglomerate-free crystallized solids.

In another embodiment of the invention, there is provided a further step c) of solid state polymerizing said agglomerate-free crystallized solids. The process of the invention is preferably performed under agitation. The process of the invention avoids the need to conduct a devolitilization step as described in U.S. Pat. No. 4,963,644, wherein a stream of inert gas must be passed over the pellets for a period of time effective to remove volatiles at a temperature below the sticking temperature of the pellets, or the pellets are subjected to a vacuum.

4. DETAILED DESCRIPTION OF THE INVENTION

A composition of PEN copolymerized with 2,7-naphthalenedicarboxylic acid, diethylene glycol, 1,4-cyclohexanedimethanol, isophthalic acid or terephthalic acid has been described in WO90/03993. This publication describes the modification of PEN with one of these monomers to lower the melting point of PEN to enable it to be more easily processed by injection stretch blow molding, reheat stretch blow molding or extrusion blow molding. This publication is silent with regard to the processing techniques used crystallize the PEN polymer, if at all, other than to state that conventional polymer processing techniques can be used to make the described polyester. This publication found that all of the described co-monomers worked well in its process, which was concerned with lowering the melt point of PEN.

With respect to the crystallization of PEN pellets, the known and/or patented techniques used to crystallize PEN involve the removal of trapped moisture within the pellet by slowly heating the pellets to their sticking temperature to sufficiently dry the pellets to avoid a signification amount of puffing under agitation, or to subject the pellets to a vacuum or a stream of inert gas in a discrete devolitilization step for a period of time below their sticking point. Each of these processes are inadequate because they slow the processing speed. However, we unexpectedly discovered a process comprising a rapid heat up towards the sticking point of a PEN copolyester by subjecting a PEN copolymerized with an alkylene glycol other than ethylene glycol, such as diethylene glycol to the rapid heat up without suffering the drawback of lumping or agglomeration. Other comonomers, such as terephthalic acid described in WO90/3993 as equally useful to diethylene glycol to lower the melt point of PEN, failed to provide PEN copolymer useful in a process herein for a rapid heat up without experiencing lumping and agglomeration, even under agitation.

The polyethylene naphthalate copolymer (PEN copolymer) utilized in accordance with the present invention is typically prepared by standard melt polymerization techniques, either in a continuous or a batch process. Such melt polymerizations result in the formation of a PEN copolymer which is essentially amorphous in nature. By this we mean that the PEN copolymer is virtually totally amorphous even though it may contain small regions where crystallinity exists.

The PEN copolymer is generally produced by melt polymerizing at least 60 mole %, preferably at least 80 mole %, and more preferably from 85 to 100 mole %, most preferably from 90 to 100 mole %, of naphthalene dicarboxylic acid, based on the total moles of carboxylic acids; with polyols comprising at least 80 mole % of ethylene glycol, preferably from 90 mole % to 96 mole %, and from 2 mole % to 20 mole % of a polyol having three or more carbon atoms, each based on the total moles of polyols. By an "acid" or a "dicarboxylic acid," when used with reference to a polyester monomer, is meant the free acid monomer, its lower alkyl esters, and other derivatives thereof which can be reacted with a glycol to produce a repeating units of naphthaleneglycol ester linkages, such as the anhydrides or the acid halides of these acids. Many conventional melt polymerization processes, however, employ the free acids, thereby avoiding the need to remove the lower alcohol by-products from the reaction mixture.

In preferred embodiments, the naphthalene dicarboxylic acid comprises a 2,6-naphthalene dicarboxylic acid. Generally, the amount of 2,6-naphthalene dicarboxylic acid will range from 85 mole % to 95 mole %, based on the moles of acid. The naphthalate units are beneficial to enhance the gas barrier properties of the polyester.

Other types of di or polycarboxylic acids can be copolymerized with naphthalene dicarboxylic acid. One example of such an additional acid in terephthalic acid, which can be added in an amount of from about 4 mole % to 40 mole %, based on the weight of all polymerizable carboxylic acids. Since it is preferred to keep the number of naphthalate units high, the preferred amount of additional di or polycarboxylic acid, preferably dicarboxylic acid, ranges from about 4 to 15 mole %, based on the total moles of polymerizing acids, more preferably from 5 to about 10 mole % of terephthalic acid. Other examples of carboxylic acids include isophthalic-, succinic-, adipic-, 1,4- and 1,3-cyclohexane-, suberic-, glutaric-, sebacic, 1,12-dodecane-, dicarboxylic acids.

The combination of the polyol having three or more carbon atoms during PEN copolymerization is necessary to avoid the devolitilization step and produce agglomerate-free crystalline solids. The amount of the polyol having three or more carbon atoms preferably ranges from 2 mole %, more preferably 3 mole %, to 20 mole %, more preferably to 10 mole %, most preferably to 7 mole %, based on the total moles of polyols. Without being bound to a theory, it is believed that the polyol having three or more carbon atoms introduces a certain polymer chain irregularity which breaks up the ability of the polymer to pack tightly and crystallize, thereby facilitating the escape of the vapors of volatized materials even though the temperature of the pellet has not yet reached the sticking temperature of the pellet.

Suitable types of polyols having three or more carbon atoms are the aliphatic, cycloaliphatic, and aromatic diol and higher hydroxyl functional polyols, including the glycol ethers. The polyol having three or more carbon atoms may or may not contain heteroatom(s) such as oxygen or nitrogen in the backbone of the molecule. Examples of the polyols having three or more carbon atoms are diethylene glycol, dipropylene glycol, 1,4-dihydroxyethoxy benzene, trimethylene glycol, tetramethylene glycol, neopentyl glycol, propylene glycol, 1,3 propane diol, triethylene glycol, 2,4-dimethyl-2-ethylhexane-1,3-diol, 2-ethyl-2-butyl-1,3-propane diol, 2-ethyl2-isobutyl-1,3-propane diol, 1,3-butane diol, 1,4-butane diol, 1,5-pentane diol, 1,6-hexane diol, 1,2-, 1,3- and 1,4-cyclohexane dimethanol, 2,2,4,4-tetramethyl-1,3-cyclobutane diol, 1,4-xylylenediol, trimethylolethane, 1,2,6-hexanetriol, alpha-methyl glucoside, glycerine, sucrose, trimethylol propane, sorbitol, pentaerythritol, and the higher molecular weight polyoxyalkylene polyether adducts made by reacting these polyols with alkylene oxides, and the like.

Preferably, the polyol having three or more carbon atoms will have 3 to 12 carbon atoms, and more preferably 3 to 8 carbon atoms, and is a diol or triol. Examples of the more preferred diols and triols having between 3 and 8 carbon atoms are trimethylene glycol, or tetramethylene glycol, diethylene glycol, dipropylene glycol, neopentyl glycol, 1,3 propane diol, triethylene glycol, 2,4-dimethyl-2-ethylhexane-1,3-diol, 1,3-butane diol, 1,4-butane diol, 1,5-pentane diol, 1,6-hexane diol, 1,2-, trimethylolethane, 1,2,6-hexanetriol, glycerine, and trimethylol propane. The intrinsic viscosity (IV) of the PEN copolymer is not limited. The PEN copolymer will generally have an initial starting IV of at least about 0.2 dl/g as measured in a 60:40 phenol:tetrachloroethane solvent system at a temperature of 30° C. and at a concentration of 0.4 g/dl. The amorphous PEN copolymer will preferably have an initial or starting IV of from about 0.3 to about 0.7 dl/g. The amorphous PEN copolymer will more preferably have an initial IV of about 0.4 to about 0.5 dl/g.

The glass transition temperature ($T_g$) of the PEN copolymer is also not limited. In general, the $T_g$ of the copolymer is above 100° C., and will often range from 105° C. to 130° C. Preferably, the $T_g$ of the copolymer ranges from 115° C. to 125° C.

In the process described in U.S. Pat. No. 4,963,644, the devolitilization step comprised heating the PEN prepolymer to a temperature below the sticking temperature of the PEN prepolymer (about 80° C. to about 140° C. ) in the presence of a stream of an inert gas or under a vacuum to devolatilize the amorphous PEN copolymer for a period of time (typically one to four hours) sufficient to remove most of the volatile materials, such as water, ethylene glycol, acetaldehyde, etc. from the PEN copolymer. This step is now eliminated in the process of this invention. The PEN copolymer may be added directly to a crystallizer, heated to any temperature throughout the range of about 150° C. to about 260° C., wherein the temperature rise of the PEN copolymer climbs at a rapid average rate of at least 10° C./min up to at least the sticking point of the PEN copolymer.

The average pellet temperature rise of at least 10° C./min is measured throughout the heat cycle from the temperature at which the pellet is introduced into the crystallizer to the sticking temperature of the PEN copolymer. To take full advantage of processing speeds, the average temperature rise of at least 10° C. occurs throughout and up to 150° C., and more preferably throughout and up to the crystallization temperature of the PEN copolymer. In another embodiment, the average rate of temperature rise up to the sticking point of the PEN copolymer is at least 15° C./min, and more preferably at least 18° C.

Since the PEN copolymer is not devolatized according to the process described in U.S. Pat. No. 4,963,644, its volatiles content when introduced to the crystallization step can advantageously be at least substantially the same as or greater than its volatiles content upon solidification at the conclusion of the melt polymerization step. In other words, the PEN copolymer solid does not need to be treated, such as by drying or devolitilization, to reduce its volatiles content between its solidification at the end of the melt polymerization step and the crystallization step. Volatiles are defined as any agent within the PEN copolymer which vaporizes at temperatures below the sticking temperature of the PEN copolymer under atmospheric pressure. Typical volatiles include water, ethylene glycol, acetaldehyde, and nitrogen. In general, the volatiles content of the PEN copolymer solids is within the range of 0.1% to 0.7%. The exact volatiles content will vary depending upon the purity of monomers and stability of the melt polymerization conditions, as well as the environmental pelletizing conditions to which the pellets are exposed, which also vary from season to season. The process of the invention is particularly useful for crystallizing pellets having high volatiles content, such as from 0.2 wt. % or more.

PEN homopolymer pellets which have not been devolatized or dried for significant periods of time undergo significant expansion and puffing as visible to the eye at the conclusion of crystallization, resulting in an agglomerate that does not break apart into the individual pellets, in many cases even when subjected to agitation. However, during and at the conclusion of the crystallization step, the PEN copolymer pellets as described herein will not agglomerate, and in most cases, there is no pellet expansion or puffing visible to the eye.

It is normally preferred to conduct the crystallization at a temperature which is within the range of about 160° C. to about 220° C. It is typically more preferred for the crystallization temperature to be within the range of 170° C. to 200° C. While agitation is not necessary to prevent agglomeration of the PEN pellets into an inseparable mass, it is preferred to agitate the PEN solids during the crystallization step to reduce their potential for lumping. The preferred form of agitation can be provided by utilizing a crystallizer which has a fluidized bed. In such fluidized bed crystallizers, air or an inert gas is typically allowed to flow through the crystallizer at a rate sufficient to maintain the chips or pellets in the fluidized state. It is, of course, also possible to perform the crystallization step in an agitated vessel. The crystallization step can be carried out as batch or a continuous operation.

The optimum period of time required for crystallization is dependent upon the equipment utilized, the type of PEN copolymer, and the size and shape of the pellets or chips. The time required for crystallization will typically be within the range of about 1 minute to about 4 hours. In a continuous process, the crystallization step will normally take about 2 minutes to about 30 minutes, preferably from about 2 minutes to 10 minutes. The PEN copolymer will usually be subjected to crystallization conditions until the solids attain a degree of crystallinity of 15% or more, more preferably 20% or more. Regardless of the residence time in the crystallizer, whether in a continuous or batch process, the average heat up rate should be as described herein until the temperature reaches at least the sticking temperature of the PEN copolymer pellet, after which any desired heat up profile can be employed.

After the PEN copolymer has been crystallized, it can be solid state polymerized in a batch or continuous process. Suitable solid state polymerization temperatures can range from a temperature just above the threshold temperature of the polymerization reaction up to a temperature within a few degrees of the sticking temperature of the PEN copolymer, which can be well below its melting point.

The solid state polymerization temperature utilized will typically be from about 1° C. to about 50° C. below the melting point of the crystallized PEN copolymer. The optimum solid state reaction temperature will differ somewhat for polymers of different composition or degree of polymerization. As a general rule, the optimum solid state polymerization temperature for the PEN copolymer will be from about 5° C. to about 20° C. below its melting point. For example, in the solid state polymerization of crystalline PEN copolymer, the temperature employed normally ranges from about 210° C. to about 265° C. Generally, the crystalline PEN copolymer will be solid state polymerized at a temperature of from about 230° C. to about 265° C. In most cases, PEN copolymer will be solid state polymerized at a temperature of from 240° C. to 260° C.

As the solid state polymerization of the PEN copolymer proceeds, its sticking temperature can increase. Thus, the solid state polymerization temperature can be incrementally increased during the course of the polymerization. For example, U.S. Pat. No. 3,718,621, describes such a technique in the solid state polymerization of PET.

The solid state polymerization is conducted under a vacuum or in the presence of a stream of an inert gas. Normally such solid state polymerizations are conducted in the presence of an inert gas stream. It is highly desirable for the inert gas to flow uniformly throughout the solid state polymerization zone which is filled with the polyester which is being polymerized. In order to help insure that the inert gas flows homogeneously or uniformly through the solid state polymerization zone without bypassing certain areas in it, a device for dispersing the inert gas is generally used. Thus, a good polymerization reactor will be designed in such a way that the inert gas will flow homogeneously through the polyester in it. It should be noted that the inert gas actually flows around the pellets or chips of polyester as it streams through the solid state polymerization zone.

Some suitable inert gases for use in the solid state polymerization process of this invention include nitrogen, carbon dioxide, helium, argon, neon, krypton, zenon, and certain industrial waste gases. Various combinations or mixtures of different inert gases can also be used. In most cases nitrogen will be used as the inert gas. In a continuous process, the mass flow ratio of PEN copolymer to nitrogen gas will be within the range of about 1:0.25 to about 1:1.

The solid state polymerization reactor employed can have a fixed bed, a static bed, a fluidized bed, or a moving bed. In most cases, it is preferred to utilize a cylindrical polymerization reactor wherein the PEN copolymer flows through the reactor for the desired residence time. Such cylindrical reactors have a substantially uniform cross-section and a sufficient height to allow the PEN copolymer to flow by reason of the force of gravity from the top to the bottom of the reactor in the desired residence time. In other words, the PEN copolymer moves from the top to the bottom of such a cylindrical polymerization reactor in a partially dammed state. The rate of flow through such a reactor can be controlled by regulating discharge at the bottom of the reactor. It is generally preferred to allow an inert gas to flow countercurrently (upwardly) through the reactor at a gas velocity well below the turbulence point so that the pellets or chips of PEN copolymer are not fluidized (always remain in contact with each other). The pellets or chips of PEN copolymer remain in substantially the same physical form throughout the solid state polymerization process.

The PEN copolymer will be solid state polymerized for a time sufficient to increase its molecular weight or IV to that of the high molecular weight PEN copolymer resin desired. It will be desirable for the high molecular weight PEN copolymer resin being prepared to have an IV of at least 0.5 dl/g. In most cases the high molecular weight resin will have an IV of at least about 0.65 dl/g and for some applications will preferably have an IV of at least about 0.8 dl/g. The polymerization time needed will normally range from about 1 to about 36 hours and in most cases will range from 6 to 24 hours.

This invention is illustrated by the following examples which are merely for the purpose of illustration and are not to be regarded as limiting the scope of the invention or the manner in which it can be practiced. Unless specifically indicated otherwise all parts and percentages are given by weight.

COMPARATIVE EXAMPLE 1

In each example, the crystallizer used was an agitated fluidized bed made of a glass tube 1.25 inches in diameter and 20 inches in length. The crystallizer had a cone-shaped bottom which was fitted with a purge gas (dried air or nitrogen) supply tube. During the crystallization test, two thirds of the length of the crystallizer was immersed in a transparent hot oil bath whose temperature was controlled at 180° C. and a stream of nitrogen, preheated to 180° C., was passed through the crystallizer at a flow rate of 16 standard cubic feet per hour. A metal rod was used to agitate the pellets being crystallized. The crystallization residence time was in each case was 15 minutes. The average rate of temperature rise from the temperature of the pellets introduced into the crystallizer (ambient) up to the time at which the pellets reached their sticking temperature was at least 10° C./min. Although the crystallizer used was a simple batch fluidized bed, it is capable of projecting the difficulty or ease with which polyester pellets are crystallized in commercial scale continuous crystallizers.

5 grams of melt polymerized PEN homopolymer pellets having an IV of 0.47 dl/g, a $T_g$ of 120° C., a melting point of 270° C., and a moisture content of 0.54% was charged into the crystallizer whose temperature was maintained at 180° C. Within a short time, as the temperature of the PEN pellets reached the softening temperature, they visibly puffed up and agglomerated into a tight lump which could not be separated, even under agitation.

COMPARATIVE EXAMPLE 2

5 grams of melt polymerized 95/5 PEN/T copolymer pellets (95 mole % of reacted naphthalene dicarboxylic acid and 5 mole % of reacted terephthalic acid, each based on the moles of all polymerizable acid monomers) was crystallized in the same fashion as in Example 1. These PEN/T copolymer pellets had an IV of 0.45 dl/g, a $T_g$ of 119° C., a melting point of 262° C., and a moisture content of 0.47%. Again, visible to the eye, the pellets puffed up and agglomerated into a tight lump which could not be separated after the crystallization.

COMPARATIVE EXAMPLE 3

5 grams of melt polymerized 90/10 PEN/T copolymer pellets having an IV of 0.46 dl/g, a $T_g$ of 118° C., a melting point of 255° C., and a moisture content of 0.28% was crystallized in the same fashion as in Example 1. During the crystallization, the pellets expanded substantially and tended to lump, but agglomeration was prevented, albeit with difficulty, by agitation. After 15 minutes of crystallization, pearl-shaped pellets were obtained.

EXAMPLE 4

About 5 grams of melt polymerized PEN copolymer pellets, prepared by adding 5 mole % of diethylene glycol to the ethylene glycol precursor, based on the moles of all polymerized hydroxyl functional compounds, was chopped into cylindrical pellets. The PEN/DEG copolymer had an IV of 0.446 dl/g, a $T_g$ of 120° C., and a DSC melting point of 260° C. The pellets as prepared had a moisture content of 0.13%. About 5 grams of these pellets, without any pretreatment for devolitilization, were crystallized in the same fashion as in Example 1. During and after the crystallization, no visible puffing or expansion of the pellets was observed and agglomeration of the pellets was prevented with agitation. Well crystallized pellets with normal appearance were obtained within the 15 minute crystallization cycle.

EXAMPLE 5

The same PEN/DEG copolymer as prepared in Example 4 was exposed to ambient atmospheric moisture to absorb more water into the pellets. A week later, the moisture content in the pellets increased to 0.20%. These pellets with the higher moisture were crystallized in the same fashion as in Example 1. Again, no visible puffing or expansion was observed during and at the conclusion of crystallization. Well crystallized pellets with normal appearance were obtained.

EXAMPLE 6

The same PEN/DEG copolymer as prepared in Example 4 was soaked in water at room temperature to maximize the moisture content. A week later, the moisture increased to 0.52%. These pellets were then crystallized in the same fashion as in Example 1. During crystallization, there was slight expansion of some of the pellets and the pellets were somewhat more sticky, but lumping and agglomeration was still prevented with agitation. Again, well crystallized pellets were obtained, although some of the crystallized pellets were slightly deformed.

There are many advantages associated with the process of this invention. As mentioned previously, if conventional PEN pellets are used, they tend to expand and agglomerate resulting in process upsets. If the PEN pellets are first devolatized, this adds a process step which increased cycle time, and in some cases, adds equipment. This invention eliminates such problems.

What is claimed is:

1. A process for crystallizing polyethylene naphthalate copolyester comprising:

a) copolymerizing at least 60 mole % of 2,6-naphthalene dicarboxylic acid, based on the total moles of carboxylic acids; with at least 80 mole % of ethylene glycol and from 2 mole % to 20 mole % of a polyol having three or more carbon atoms, each based on the total moles of polyols, to form PEN copolymer solids; and b) subsequently crystallizing said solids comprising heating said solids to at least their sticking temperature at an average rate of at least 10° C./min, to form agglomerate-free crystallized solids.

2. The process of claim 1, wherein the amount of 2,6-naphthalene dicarboxylic acid is at least 80 mole %.

3. The process of claim 2, wherein the amount of polyol having three or more carbon atoms ranges from 3 mole % to 10 mole %.

4. The process of claim 3, wherein the amount of 2,6-naphthalene dicarboxylic acid ranges from 85 mole % to 100 mole %, the amount of ethylene glycol ranges from 90 mole % to 96 mole %, and the amount of polyol having three or more carbon atoms ranges from 3 mole % to 10 mole %.

5. The process of claim 4, wherein said polyol having three or more carbon atoms comprises diethylene glycol, dipropylene glycol, trimethylene glycol, tetramethylene glycol, or triethylene glycol.

6. The process of claim 5, wherein said polyol having three or more carbon atoms comprises diethylene glycol.

7. The process of claim 6, wherein the amount of 2,6-naphthalene dicarboxylic acid ranges from 85 mole % to 95 mole %, the amount of ethylene glycol ranges from 90 mole % to 96 mole %, and the amount of diethylene glycol ranges from 4 mole % to 10 mole %.

8. The process of claim 1, further comprising copolymerizing with terephthalic acid in an amount of from 5 to 15 mole %.

9. The process of claim 1, wherein step (b) comprises heating the solids to their sticking temperature at an average rate of at least 15° C./min.

10. The process of claim 1, wherein said solids are heated in step b) to at least 150° C. at said rate.

11. The process of claim 10, wherein said solids are heated at an average rate of at least 18° C./min.

12. The process of claim 1, wherein the volatiles content within said solids immediately prior to subjecting the solids to step b) ranges from 0.1% to 0.7%.

13. The process of claim 1, wherein said pellets neither puff nor agglomerate during crystallization by naked eye observation.

14. The process of claim 1, wherein the solids are heated in step b) at said rate to their crystallization temperature.

15. The process of claim 14, wherein the solids are heated at a rate of at an average rate of at least 15° C./min.

16. The process of claim 1, wherein the IV of the copolymer ranges from about 0.3 to about 0.7 dl/g prior to crystallization.

17. The process of claim 1, wherein the molecular weight of the crystallized solids are advanced by solid state polymerizing the crystallized solids.

18. The process of claim 1, wherein said solids in step b) have a volatiles content ranging from 0.1 wt. % to 0.7 wt. %, and are heated to at least 150° C. at said average rate.

19. The process of claim 18, wherein said solids are heated to at least the crystallization temperature of the solids at said average rate.

20. The process of claim 19, wherein said average rate is at least 18° C./min.

21. The process of claim 1, wherein said solids have a volatiles content within the range of 0.1 wt. % to 0.7 wt. % prior to introduction into step b), the PEN copolymer comprises from 2 wt. % to 10 wt. % of diethylene glycol, and the solids are heated under agitation to at least 150° C. at said average rate.

22. The process of claim 1, wherein step b) is carried out in a continuous process.

23. The process of claim 22, wherein step b) is carried out in a fluidized bed crystallizer.

24. A process for crystallizing polyethylene naphthalate copolyester comprising:
 a) copolymerizing at least 60 mole % of 2,6-naphthalene dicarboxylic acid, based on the total moles of carboxylic acids; with at least 80 mole % of ethylene glycol and from 2 mole % to 20 mole % of a polyol having three or more carbon atoms, each based on the total moles of polyols, to form PEN copolymer solids; and
 b) subsequently crystallizing said solids comprising heating said solids to at least their sticking temperature at an average rate of at least 10° C./min, to form agglomerate-free crystallized solids; and
 c) subsequently solid state polymerizing said crystallizing solids.

25. The process of claim 24, wherein the amount of 2,6-naphthalene dicarboxylic acid ranges from 85 mole % to 100 mole %, the amount of ethylene glycol ranges from 90 mole % to 96 mole %, and the amount of polyol having three or more carbon atoms ranges from 3 mole % to 10 mole %.

26. The process of claim 25, wherein said polyol having three or more carbon atoms comprises diethylene glycol, dipropylene glycol, trimethylene glycol, tetramethylene glycol, or triethylene glycol.

27. The process of claim 26, wherein said polyol having three or more carbon atoms comprises diethylene glycol.

28. The process of claim 27, wherein the amount of 2,6-naphthalene dicarboxylic acid ranges from 85 mole % to 95 mole %, the amount of ethylene glycol ranges from 90 mole % to 96 mole %, and the amount of diethylene glycol ranges from 4 mole % to 10 mole %.

29. The process of claim 1, further comprising copolymerizing with terephthalic acid in an amount of from 5 to 15 mole %.

30. The process of claim 1, wherein step (b) comprises heating the solids to their sticking temperature at an average rate of at least 15° C./min.

31. The process of claim 30, wherein said solids are heated in step b) to at least 150° C. at an average rate of at least 15° C./min.

32. The process of claim 31, wherein said solids are heated at an average rate of at least 18° C./min.

33. The process of claim 24, wherein the volatiles content within said solids immediately prior to subjecting the solids to step b) ranges from 0.1% to 0.7%.

34. The process of claim 24, wherein said pellets neither puff nor agglomerate during crystallization by naked eye observation.

35. The process of claim 24, wherein the solids are heated in step b) at said rate to their crystallization temperature.

36. The process of claim 35, wherein the solids are heated at a rate of at an average rate of at least 15° C./min.

37. The process of claim 24, wherein the IV of the copolymer ranges from about 0.3 to about 0.7 dl/g prior to crystallization.

38. The process of claim 24, wherein said solids in step b) have a volatiles content ranging from 0.1 wt. % to 0.7 wt. %, and are heated to at least 150° C. at said average rate.

39. The process of claim 38, wherein said solids are heated to at least the crystallization temperature of the solids at said average rate.

40. The process of claim 39, wherein said average rate is at least 18° C./min.

41. The process of claim 24, wherein said solids have a volatiles content within the range of 0.1 wt. % to 0.7 wt. % prior to introduction into step b), the PEN copolymer comprises from 2 wt. % to 10 wt. % of diethylene glycol, and the solids are heated under agitation to at least 150° C. at said average rate.

42. The process of claim 24, wherein step b) is carried out in a continuous process.

43. The process of claim 24, wherein step b) is carried out in a fluidized bed crystallizer.

44. A process for crystallizing polyethylene naphthalate copolyester comprising:
 a) copolymerizing at least 85 mole % of 2,6-naphthalene dicarboxylic acid, based on the total moles of carboxylic acids; with polyols comprising at least 90 mole % of ethylene glycol and from 4 mole % to 10 mole % of a polyol having three or more carbon atoms comprising a diol or triol having from three to eight carbon atoms, each based on the total moles of polyols, to form PEN copolymer solids having an average volatiles content ranging from 0.1 wt. % to 0.7 wt. % based on the weight of the solids; and b) subsequently crystallizing said solids comprising heating said solids to at least 150° C. an average rate of at least 10° C./min, to form agglomerate-free crystallized solids.

45. The process of claim 44, wherein said polyol having, three or more carbon atoms comprises diethylene glycol, dipropylene glycol, trimethylene glycol, tetramethylene glycol, or triethylene glycol in an amount of from 4 mole % to 10 mole %.

46. The process of claim 45, wherein said polyol having three or more carbon atoms comprises diethylene glycol or dipropylene glycol in an amount ranging from 4 mole % to 10 mole %.

47. The process of claim 44, wherein said solids are heated at an average rate of at least 15° C./min.

48. The process of claim 47, wherein said solids are heated at an average rate of at least 18° C./min.

49. The process of claim 45, wherein said polyol comprises diethylene glycol in an amount of from 4 mole % to 10 mole %, and said solids are heated at an average rate of 15° C. to at least 150° C.

* * * * *